United States Patent

Behnsen et al.

[11] Patent Number: 5,820,710
[45] Date of Patent: Oct. 13, 1998

[54] BELTED TIRE WITH SPECIFIED CARCASS PLY TURN UP

[75] Inventors: Klaus Behnsen, Hanover; Werner Knauf, Wunstorf; Eckhard Kuhlmann, Hanover, all of Germany

[73] Assignee: Continental Aktiengesellschaft, Hanover, Germany

[21] Appl. No.: 768,480

[22] Filed: Dec. 18, 1996

[51] Int. Cl.⁶ .............................. B60C 9/02; B60C 15/00; B60C 15/06

[52] U.S. Cl. ...................... 152/541; 152/539; 152/543; 152/547; 152/548; 152/550; 152/551; 152/552; 152/564

[58] Field of Search .................................. 152/539, 541, 152/543, 547, 548, 550, 551, 552, 564, 554

[56] References Cited

U.S. PATENT DOCUMENTS 3,938,575  2/1976  Boileau ................ 152/554 X
5,261,476  11/1993  Kobayashi et al. .

FOREIGN PATENT DOCUMENTS

| 0250605 | 1/1988 | European Pat. Off. . |
| 0615868 | 9/1994 | European Pat. Off. . |
| 2106452 | 12/1971 | German Dem. Rep. . |
| 2515853 | 10/1975 | German Dem. Rep. . |
| 2828241 | 1/1980 | German Dem. Rep. . |
| 3519212 | 12/1985 | German Dem. Rep. . |

*Primary Examiner*—Adrienne C. Johnstone
*Attorney, Agent, or Firm*—Robert W. Becker & Associates

[57] ABSTRACT

A belted tire, especially for motor vehicles, has an inner carcass ply, the end portions of which extend from the inner surface of the tire, about an annular bead core, toward the outer surface of the tire. To form a connection point, the end of the outer section of the carcass ply is placed against the inwardly disposed section. The carcass ply approaches the bead core essentially tangentially, and is disposed thereabout. Between the bead core and the connection point, the two carcass ply sections extend linearly and have essentially the same length.

9 Claims, 1 Drawing Sheet

– 5,820,710 –

BELTED TIRE WITH SPECIFIED CARCASS PLY TURN UP

BACKGROUND OF THE INVENTION

The present invention relates to a belted tire, especially for motor vehicles.

A belted tire having an inner carcass ply, the end portions of which extend from the inner surface of the tire to the outer surface of the tire and are disposed about an annular bead core, and the end of the outer section of the carcass ply being placed against the inwardly disposed section to form a connection point, is known, for example, from EP-B 0 250 605.

U.S. Pat. no. 5,261,476 discloses a radial tire where the carcass ply is disposed about a hexagonal core, and the outer section and the inner section extend linearly; however, the two sections do not come together to a connection point. The profiled core section between the two sections is soft, but is formed from varying hardnesses. In particular, the upper portion of the profiled core portion has a Shore A hardness of 58 to 60, while the lower portion has a Shore A hardness of not more than 55. DE-A 28 28 241 also discloses forming the profiled core portion of soft rubber.

A lot of demands are made of modern vehicle tires. In addition to a good damping characteristic, the tire should, among other things, also ensure good wear and also have certain emergency operation characteristics. Appropriate high quality materials must be available for the manufacture of the carcass ply, which is built up of several layers, as well as for the tire construction itself and the tread portion. The materials that are utilized are expensive. Since the tire of a vehicle is part of the unsprung mass, it is desirable to keep the weight thereof as low as possible. With the heretofore known tires, a tension/compression stress occurs in the region of the carcass end that is looped about the bead core; this tension/compression stress leads to a deformation of the carcass (S-impact), and hence also to a deformation of the tire. This leads to a lifting off of the base of the tire as it leaves the contact surface, which increases not only the rolling friction (wear), but also the rolling noise.

Starting from this statement of the problem, it is an object of the present invention to improve a tire of the aforementioned general type. In particular, it is an object of the present invention to avoid the compression stress in the region of the looped-around carcass end.

BRIEF DESCRIPTION OF THE DRAWING

These and other objects and advantages of the present invention will appear more clearly from the following specification in conjunction with the accompanying schematic drawing, in which.

Summary of the Invention

Figure 1:
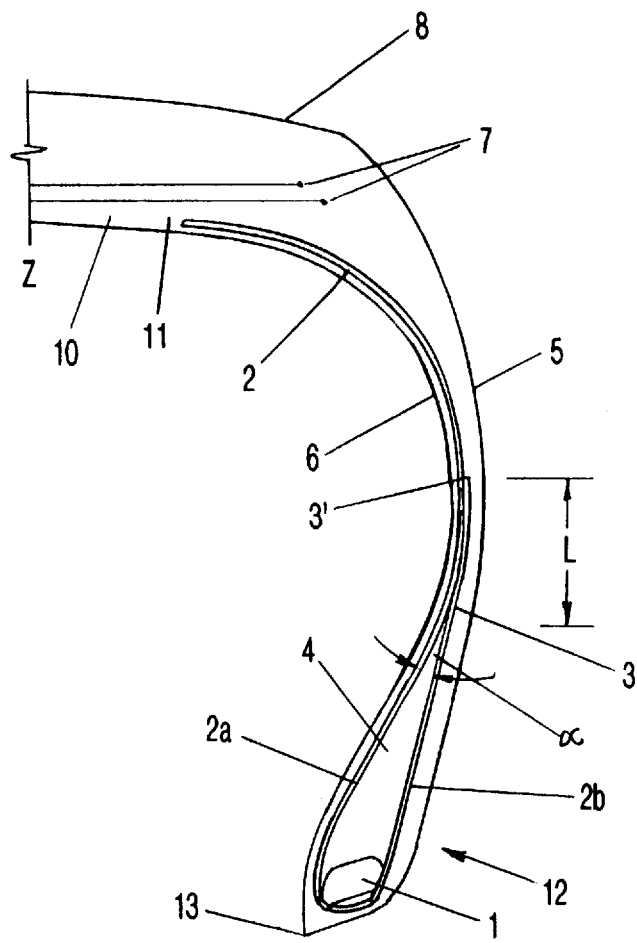
FIG. 1 is a partial cross-sectional view of one exemplary embodiment of the inventive tire.

The tire of the present invention comprises a carcass ply having two ends that are respectively disposed about an annular bead core. Each of the ends of the carcass ply, in the vicinity of the pertaining bead core, first, as an inner section, essentially tangentially approaches the bead core from an inner surface of the tire, is then disposed about the bead core, and then, as an outer section, extends essentially tangentially from the bead core toward an outer surface of the tire. The outer section of the carcass ply has an end portion thereof disposed against the inner section of the carcass ply to form an engagement section, of finite length, having a lower connection point that faces the bead core and an upper connection point that is remote from the bead core. The inner and outer sections of the carcass ply extend essentially linearly, have essentially the same length between the lower connection point and the bead core, and at the lower connection point form an acute angle. The length of the engagement section between the lower and upper connection points is at least 3 mm per bar of internal pressure of the tire. A bead filler is disposed between the inner and outer sections of the carcass ply and has a Shore A hardness of 40 to 60.

Due to the fact that the carcass ply approaches the bead core essentially tangentially and is disposed thereabout, and due to the fact that the two sections of the carcass ply between the bead core and the point of connection extend linearly and have the same length, only pulling or tension forces occur in the carcass ply (cable principle). This increases the stability of the tire. In addition, due to the elimination of the compression forces, the S-impact, i.e. S-shaped deformation, of the carcass ply is eliminated. The carcass is consequently automatically disposed on the ideal radial line. In contrast to comparable tires constructed pursuant to the state of the art, the carcass of the inventive tire must consequently be shorter, thereby resulting in a saving in material.

Due to the fact that the sections of the carcass ply join one another at an acute angle at the point of connection, the loop that is disposed about the bead core can be slim or narrow. As a result of this feature, especially in the bead portion the tire can be kept more narrow. The angle between the carcass sections is advantageously about 20°. The soft construction of the bead filler with a Shore A hardness of 40 to 60, and especially preferably 50, makes it possible for the carcass sections to spread when the tire is stressed; this relieves the tension of the cable. The carcass ply is thereby freed from compression forces in the tire contact surface.

Due to the fact that the length between the lower connection point and the upper connection point is designed as a function of the internal pressure of the tire, the material that is used is optimized in relationship to the strength of the tire. For truck tires, which are operated with a high internal pressure, the carcass sections are placed against one another over a correspondingly long region, whereas for passenger tires, which are operated with a comparatively low internal pressure, the engagement surface is correspondingly short.

The bead filler can be made of the material (carcass mixture) that is used to enclose the carcass core. In such a case, it is possible to eliminate the insertion of a bead filler, for example a wedge-shaped filler, of a different material, which inserted filler requires a further step during manufacture. This results not only in a reduction of the manufacturing costs, but also in a reduction of the weight of the tire.

Eliminating the bead reinforcement has the further advantage that a shearing zone no longer results in the base of the bead below the core.

It is furthermore advantageous if the profiled "flange" member, i.e. chafer that would face a rim flange, is hard relative to the bead filler, having a Shore A hardness of 70–95, especially 85, and if it ends below the connection point.

The carcass ply, which with the inventive construction takes up only pulling or tension forces, can be divided in the zenith portion of the tire, with the separation gap having a width of at least 30 mm. As a result, without sacrificing strength, a further reduction in weight and cost can be achieved during manufacture.

If the sections of the carcass ply extend parallel to the appropriate outer surfaces, the thickness of the material between the carcass ply and the interior of the tire is constant, so that the diffusion becomes easier to control and the tire becomes more airtight accompanied by uniform carcass stress.

The lower connection point is preferably disposed below that point having the maximum axial expansion when the tire is stressed.

When all of the preferred features are utilized, it is possible, relative to a conventional tire, to achieve a weight saving of about 15 kg.

Further specific features of the present invention will be described in detail subsequently.

DESCRIPTION OF PREFERRED EMBODIMENTS

Figure 2:
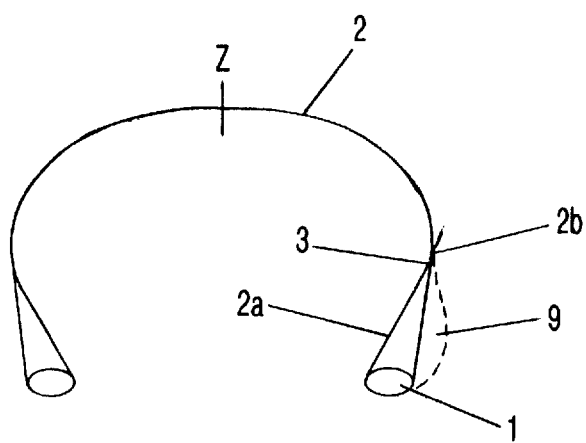
FIG. 2 is a cross-sectional view illustrating the principle of a further exemplary embodiment of the inventive tire.

Referring now to the drawing in detail, the tire comprises the carcass 2, an airtight rubber layer 11, the belt 7, the tread portion 8 that is disposed over the belt, as well as the bead portion 12 in which is disposed the bead core 1. As is customary, the carcass 2 comprises an airtight rubber layer, which is known as the inner core or layer and upon which is placed the so-called insert material, which comprises insert filaments (cord) embedded in rubber material. The two ends of the carcass 2 are guided about the bead core 1 in a loop-like manner, and, in order to provide a connection point 3, the outer, upwardly returned section 2b is placed against the inner, downwardly guided section 2a of the carcass 2 at the level of the maximum axial width of the tire. In so doing, the rubber of the two sections 2a, 2b of the carcass 2 rest against one another. In the region between the lower connection point 3 and the bead core 1, the sections 2a, 2b extend essentially linearly and have essentially the same length. The angle α formed by the two sections 2a, 2b at the connection point 3 is about 20°, thus achieving as slim or narrow a configuration of the loop as possible. The sections 2a, 2b approach the bead core 1 tangentially and extend about such bead core. The bead core 1 can be hexagonal, round, or have any other desired shape. The wedge-shaped bead filler that with belted tires of conventional construction generally has to be provided between the sections 2a and 2b, and which wedge-shaped bead filler has to be separately inserted, can be entirely eliminated, and the bead filler 4 of the present invention is made as soft as possible, whereby the rubber mixture that is used for producing the carcass 2 is also used as the bead filler 4. The soft bead filler offers the advantage that when stress is applied, the sections 2a, 2b can first move apart at the lower connection point 3, so that the loop becomes larger. The length L between the lower connection point 3 and the upper connection point 3' is such that it is at least 3 mm per bar of internal pressure. The inner section 2a extends parallel to the inner surface 6 of the tire, and the outer section 2b extends parallel to the outer surface 5 of the tire. Alternatively, a chafer or profiled "flange" member 9 (FIG. 2) can be provided that is hard relative to the bead filler 4. It has been shown to be advantageous for the bead filler 4 to have a Shore hardness of 40–60, while the chafer 9 has a Shore hardness of 70–95. The lower connection point 3, calculated from the lower edge 13 of the tire, is disposed at about 20–30% of the radial height, or 10–20% of the radial height below the maximum axial width, so that the length L that covers the distance from the lower connection point 3 to the upper connection point 3' overlaps the point of the maximum axial width of the tire. Due to the linear course of the sections 2a, 2b between the lower connection point 3 and the bead core 1, the carcass 2 takes up only pulling or tension forces, as a result of which the wall thicknesses in the region of the bead and sidewall can be reduced relative to conventional tires. As a consequence of the elimination of the bead filler and chafer in the bead portion 12, and the reinforcement of the bead, a reduction in weight of up to 15 kg can be achieved relative to comparable conventional tires.

The carcass 2 can be divided in the zenith portion Z of the tire, with the separation gap 10 on the whole being at least 30 mm. The chafer or profiled "flange" member 9 ends below the lower connection point 3.

The present invention is, of course, in no way restricted to the specific disclosure of the specification and drawings, but also encompasses any modifications within the scope of the appended claims.

What we claim is:

1. A belted tire, comprising:
   a carcass ply having two ends respectively disposed about an annular bead core, wherein each of said ends of said carcass ply, in the vicinity of the pertaining bead core, first, as an inner section, essentially tangentially approaches said bead core from an inner surface of said tire, is then disposed about said bead core, and then, as an outer section, extends essentially tangentially from said bead core toward an outer surface of said tire, wherein said outer section of said carcass ply has an end portion thereof disposed against said inner section of said carcass ply to form an engagement section, of finite length, having a lower connection point that faces said bead core and an upper connection point that is remote from said bead core, wherein said inner and outer sections of said carcass ply extend essentially linearly, have essentially the same length between said lower connection point and said bead core, and at said lower connection point form an acute angle, and wherein said length of said engagement section between said lower and upper connection points is at least 3 mm per bar of internal pressure of said tire; and
   a bead filler disposed between said inner and outer sections of said carcass ply, said bead filler having a Shore A hardness of 40 to 60.

2. A belted tire according to claim 1, wherein said angle between said sections of said carcass ply is approximately 20°.

3. A belted tire according to claim 1, wherein a chafer is disposed outwardly of said outer section of said carcass ply, said chafer being hard relative to said bead filler.

4. A belted tire according to claim 3, wherein said chafer has a Shore A hardness of 70–95, and ends below said lower connection point.

5. A belted tire according to claim 1, wherein said bead core provides the exclusive reinforcement for a bead portion of said tire.

6. A belted tire according to claim 1, wherein said carcass ply is divided in a zenith portion of said tire.

7. A belted tire according to claim 6, wherein a separation gap of said divided carcass ply has a width of at least 30 mm.

8. A belted tire according to claim 1, wherein said inner section of said carcass ply extends parallel to said inner surface of said tire, and said outer section of said carcass ply extends parallel to said outer surface of said tire.

9. A belted tire according to claim 1, wherein said bead filler is made of the same carcass mixture material that is utilized to encase cords of said carcass ply.

* * * * *